United States Patent
Maguire et al.

(10) Patent No.: US 9,509,018 B2
(45) Date of Patent: Nov. 29, 2016

(54) EXPANDED BATTERY COOLING FIN

(71) Applicant: FORD GLOBAL TECHNOLOGIES, LLC, Dearborn, MI (US)

(72) Inventors: Patrick Daniel Maguire, Ann Arbor, MI (US); Neil Robert Burrows, White Lake Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 283 days.

(21) Appl. No.: 14/156,891

(22) Filed: Jan. 16, 2014

(65) Prior Publication Data

US 2015/0200426 A1 Jul. 16, 2015

(51) Int. Cl.
| | |
|---|---|
| *H01M 6/50* | (2006.01) |
| *H01M 10/42* | (2006.01) |
| *H01M 2/10* | (2006.01) |
| *H01M 10/625* | (2014.01) |
| *H01M 10/647* | (2014.01) |
| *H01M 10/6551* | (2014.01) |
| *H01M 10/6555* | (2014.01) |
| *H01M 10/613* | (2014.01) |
| *H01M 10/6568* | (2014.01) |

(52) U.S. Cl.
CPC ....... *H01M 10/4207* (2013.01); *H01M 2/1077* (2013.01); *H01M 10/613* (2015.04); *H01M 10/625* (2015.04); *H01M 10/647* (2015.04); *H01M 10/6551* (2015.04); *H01M 10/6555* (2015.04); *H01M 10/6568* (2015.04); *H01M 2220/20* (2013.01)

(58) Field of Classification Search
CPC ...................................................... H01M 6/50
See application file for complete search history.

(56) References Cited

U.S. PATENT DOCUMENTS

| | | | |
|---|---|---|---|
| 6,422,027 B1 | 7/2002 | Coates, Jr. et al. | |
| 8,409,743 B2 | 4/2013 | Okada et al. | |
| 2009/0258289 A1* | 10/2009 | Weber ................. | H01M 10/647 429/120 |
| 2013/0115506 A1 | 5/2013 | Wayne et al. | |
| 2013/0171491 A1* | 7/2013 | Wei ..................... | H01M 2/1077 429/120 |

* cited by examiner

*Primary Examiner* — Jacob Marks
(74) *Attorney, Agent, or Firm* — David B. Kelley; Brooks Kushman P.C.

(57) ABSTRACT

A battery assembly includes a plurality of battery cells and a plurality of fins arranged in an array. Each of the cells has a side portion disposed against the fins. Each fin defines a serpentine fluid channel having an inlet and an outlet, and a plurality of parallel sections extending across the cells such that lengths of the sections increase from the inlet to the outlet. The length of at least one of the sections near the outlet is greater than the width of the cells and the length of at least one of the sections near the inlet is less than the width of the cells.

13 Claims, 2 Drawing Sheets

EXPANDED BATTERY COOLING FIN

TECHNICAL FIELD

This disclosure relates to cooling fins for the thermal management of battery cells in electric vehicles.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

Vehicles with batteries may include cooling systems to provide temperature control for the batteries to extend life and improve performance.

SUMMARY

In one embodiment, the battery includes adjacent cells and a fin disposed between the cells. The fin defines a serpentine fluid channel having an inlet and outlet, and a plurality of parallel sections extending across the cells such that lengths of the sections increase from the inlet to the outlet. The length of at least one of the sections near the outlet is greater than a width of the cells to increase heat transfer near the outlet.

In another embodiment, a battery assembly includes a battery array having at least two cells and a heat exchanger disposed between and in thermal communication with the cells. The heat exchanger has a plurality of generally parallel channels configured to direct fluid between an inlet port and an outlet port. The channels near the outlet are greater in length than the channels near the inlet.

In yet another embodiment, a battery assembly includes adjacent cells, each having a sidewall and at least one cooling fin disposed between the cells at the sidewall. The at least one cooling fin defines a serpentine cooling channel having an inlet and an outlet, and a plurality of generally parallel sections extending across the cells such that lengths of the sections increased from the inlet to the outlet. The length of at least one of the sections near the outlet extends beyond a perimeter of the sidewalls, and at least one of the sections is surrounded by the perimeter of the sidewalls.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
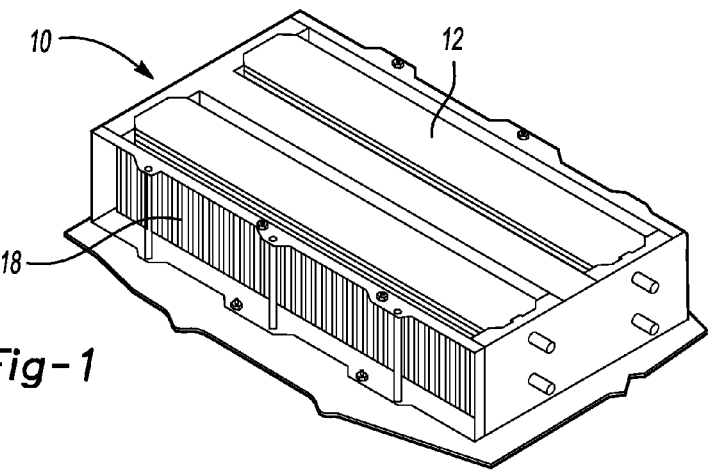
FIG. 1 is a perspective view of a battery assembly.

Referring to FIG. 1, a traction battery assembly 10 is shown. Electric vehicles may include an energy system having a traction battery assembly 10 with components such as one or more battery cell arrays 12, a battery electrical control module (not shown), and a direct current to direct current converter unit (not shown). The battery cell arrays 12 may provide energy to operate the vehicle and its systems. Each battery cell array 12 may include a plurality of battery cells 18 connected in series or parallel. The battery cells 18, such as a prismatic cell, convert stored chemical energy to electrical energy. The cells 18 may include a housing, a positive electrode (cathode) and a negative electrode (anode). An electrolyte may allow ions to move between the anode and cathode during discharge, and then return during charge. Terminals may allow current to flow out of the cell for use by the vehicle. The terminal of each battery cell may be aligned with opposing terminals (positive and negative) adjacent to one another to facilitate a series connection between the battery cells when positioned in an array.

The cells operate more efficiently and have increased life if they are maintained within an optimal temperature range during vehicle operation. The battery assembly 10 may include a thermal management system to control the temperature of the battery assembly 10. The thermal management of the battery assembly 10 may be accomplished by a variety of systems such as air or liquid cooled systems. A liquid cooled system may circulate a fluid to heat or cool the battery array 12.

Figure 2:
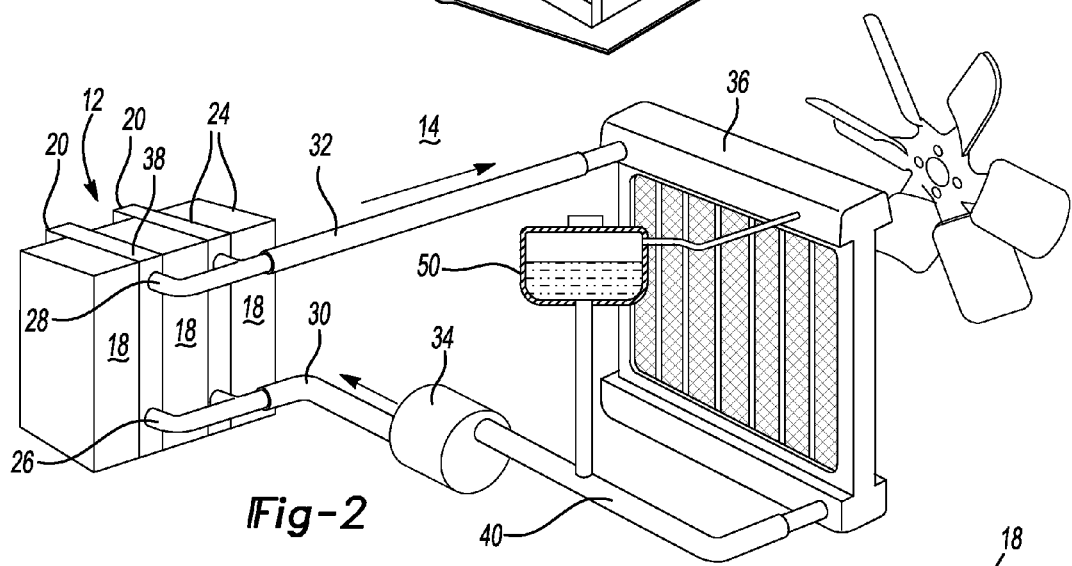
FIG. 2 is a diagrammatical view of a battery assembly thermal management system.

Referring to FIG. 2, a diagrammatical view is shown of a thermal management system 14 for the battery assembly 10. The battery array 12 includes a plurality of cells 18 and a plurality of cooling fins 20. Each of the cells 18 has two opposing sidewalls 24. Each of the fins 20 is disposed between corresponding sidewalls 24 of two adjacent cells 18. Each of the fins 20 is in thermal communication with a corresponding sidewall 24 of the cells 18 to provide heating or cooling to the cells 18 and the battery assembly 10. Each of the fins 20 has an extended portion 38 which extends beyond the sidewalls 24 of the cells 18. The extended portions 38 provide additional heat transfer as compared to fins which do not include an extended portion. FIG. 2 shows a configuration of one fin for every cell, however, it is to be understood that a greater of fewer number of fins could be used depending upon design constraints.

Each of the fins 20 has an inlet port 26 coupled to a supply hose 30. The supply hose 30 is coupled to a pump 34. Each of the fins 20 also has an outlet port 28 coupled to a return hose 32. The return hose 32 is coupled to a radiator 36. The radiator 36 is connected to the pump 34 via the reservoir hose 40. A coolant reservoir 50 is connected to the reservoir hose 40 and to the radiator 36. The above components cooperate with each other to form a continuous coolant loop. Other arrangements, however, are also contemplated.

In operation, the pump 34 circulates cold coolant into the fins 20 via the supply hose 30. The fin 20 is a heat exchanger and the coolant circulating though the fin 20 conducts heat away for the cells to thermally manage cell temperature. Hot coolant exits the fin 20 though the outlet port 28 and is circulated to the radiator 36 via the return hose 32. The radiator 36 disperses thermal energy from the hot coolant to the air and cools the coolant as it travel through the radiator 36, thus returning the coolant to cold coolant. The cold coolant is then returned to the pump 34 for recirculation via the reservoir hose 40. The terms hot and cold are relative terms and do not necessarily suggest any specific temperature ranges.

In an alternative embodiment, the fins 20 can be dual purpose fins used to heat and cool the battery cells 18. This may be useful at initial startup to quickly bring the cells into optimal operating temperature. This may be even more useful during the colder months of the year. Hot coolant can be supplied to the thermal system 14 from an internal combustion engine (not shown) in the case of a hybrid vehicle. In a pure electric vehicle, a heater (not shown) could be used to heat the coolant.

Figure 3:
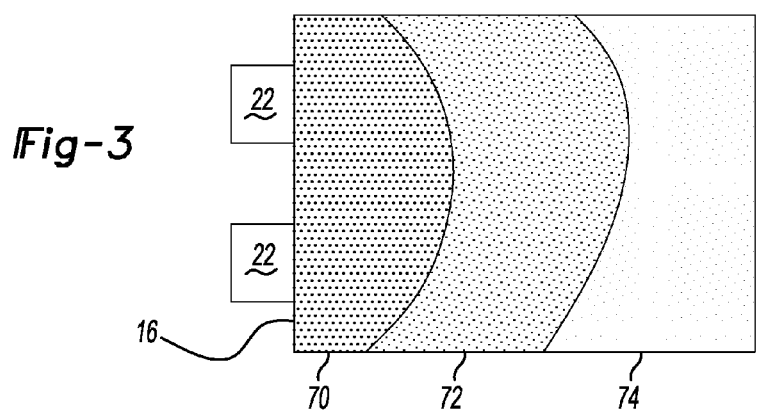
FIG. 3 side view of a battery cell illustrating thermal gradient zones.

Referring to FIG. 3, the battery 18 includes a terminal side 16, which has a pair of terminals 22 extending outwardly therefrom. The chemical reactions taking place during cell discharge generate heat and cause the cell 18 to warm. This warming is not uniform. The cell 18 may be generalized into three temperature zones 70, 72 and 74. Zone 70 is the hot zone, zone 72 is a moderate zone and zone 74 is the cold zone. As above, the terms hot, moderate and cold are relative terms and do not necessarily suggest any specific temperature ranges. Zone 70 is located proximate the terminal side 16. The most heat is generated by the cell 18 in this area because this is the area of greatest current flow between the cathode and anode. Zone 72 is located at the middle of the cell 18 and generates a medium amount of heat as compared to zones 70 and 74. Zone 74 is located on the cell opposite the terminal side 16. The least amount of current is transferred in this zone causing it to be the coolest.

Figure 4:
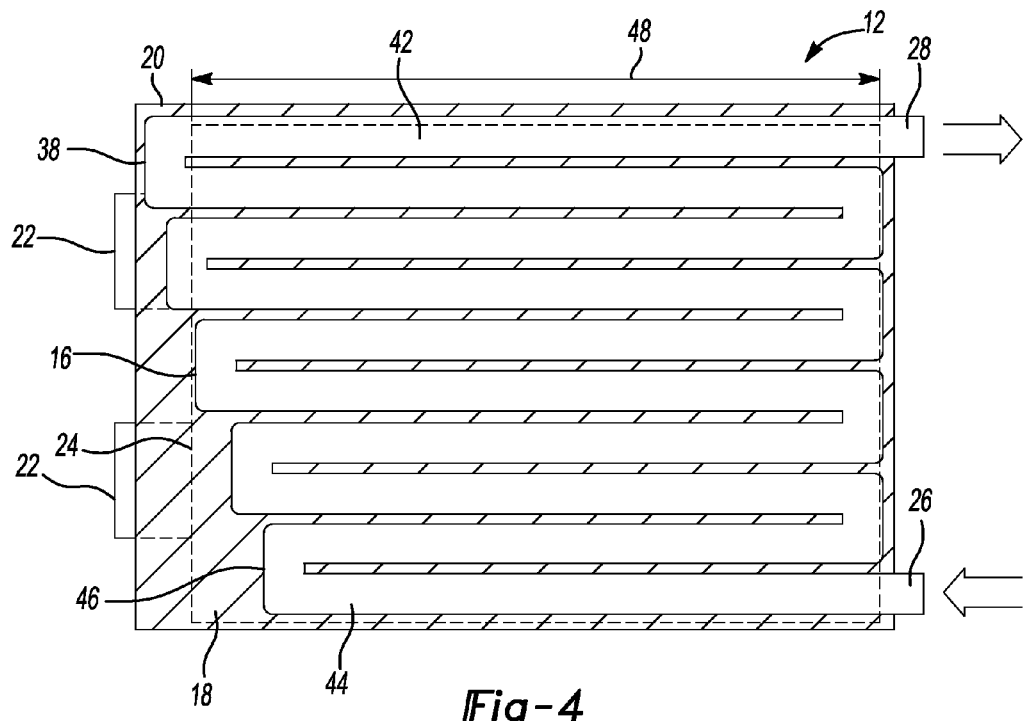
FIG. 4 is a cross-section view of a battery array.

Referring to FIG. 4, the amount of heat transferred from the cells 18 to the coolant is a function of the temperature differential (delta T) between the cells 18 and the coolant. A coolant with a high delta T is able to absorb more heat from the cells 18 than a coolant with a low delta T. The coolant proximate inlet 26 is the coldest having the highest delta T. The coolant proximate the outlet 28 is the hottest having the lowest delta T. Thus, more heat flux occurs along the fin 20 near the inlet 26 than near the outlet 28. The coolant near the outlet is hotter than the coolant near the inlet because the coolant absorbs heat from the cell as it travel along the serpentine coolant channel 42.

Referring still to FIG. 4, a cross-section view is shown of the battery array 12. The fin 20 is disposed against the sidewall 24 of the cell 18. The fin 20 is rectangular in shape to match the shape of the cell 18 albeit slightly larger. The fin 20 has an extended portion 38 that extends beyond the cell 18 at the terminal side 16 of the cell 18. The fin 20 defines a serpentine coolant channel 42. The inlet and outlet ports 26, 28 provide openings into the serpentine coolant channel 42 to couple with the supply and return hoses 30, 32. The coolant channel 42 has a plurality of generally parallel sections 44 interconnected by a plurality of return bends 46. The return bends 46 interconnect adjacent parallel sections 44 in fluid communication. The parallel sections 44 have a generally uniform cross section. The parallel sections 44 extend across a width 48 of cell 18. The lengths of the parallel sections 44 increase from the inlet 26 to the outlet 28 providing a more uniform heat flux across the fin 20 and thus a more uniform cell temperature.

Uneven cell temperature can lead to reduced cell life. Longer and shorter parallel sections 44 can be used to offset delta T differences and achieve a more consistent heat flux across the surface of the fin 20. The coolant temperature is the coldest near the inlet 26 and therefore the length of the pipe sections 44 near the inlet 26 are the shortest. The coolant temperature is the hottest near the outlet 28 and therefore the length of the pipe sections 44 near the outlet 28 are the longest. Varying the length of the pipe sections 44 provides a similar heat flux between the pipe sections 44 despite the varying coolant temperatures within the pipe sections 44. The two parallel sections 44 nearest the inlet 26 are shorter than the width 48 of the cell 18 and are within the sidewall 24. The two parallel sections 44 nearest the outlet 28 are longer than the width 48 of the cell 18 and extend beyond the sidewall 24 into the extended portion 38 of the fin 20. More or less than two pipe sections 44 can be longer than the width 48 of the sidewall 24 of the cell 18. Similarly, more or less than two pipe sections 44 can be shorter than the width 48 of the sidewall 24. The extended portion 38 is rectangular. The extended portion 38, however, could be tapered to correspond with the coolant channels 42 as shown in FIG. 5.

The parallel pipe sections 44 within the extended portion 38 are capable of conducting heat from the cell 18 even though they are not in contact with the cell 18. The fin 20 is made out of a thermally conductive material, such as aluminum. The fin 20 conducts heat from the cell 18 causing the fin to warm. The extended portion 38 also warms. As the coolant circulates through the parallel sections 44, in the extended portion 38, heat is removed from the extended portion 38 providing additional heat flux. It may be advantageous to position the cooling fin 20 such that the extended portion 38 is located near the terminals 22 as opposed to on a side that does not have terminals. The battery produces the most heat near the terminals 22 and the additional heat flux provided by the extended portion 38 could help to maintain a more uniform cell temperature across the cell 18.

Figure 5:
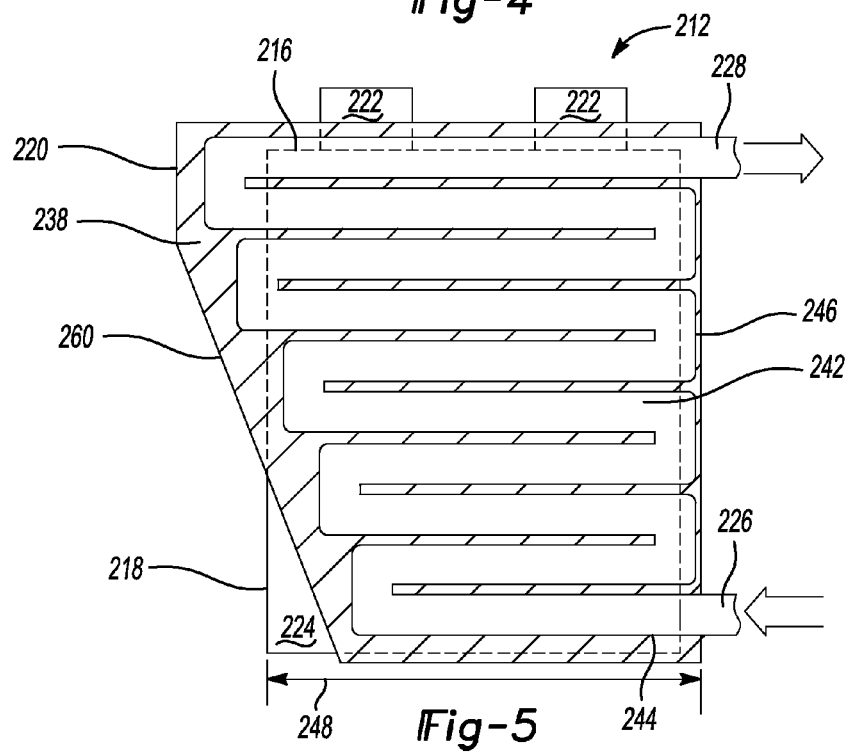
FIG. 5 is a cross-section view of another battery array.

Referring to FIG. 5, a cross-section view is shown of an alternative battery array 212. The embodiment of FIG. 5 is similar to the embodiment of FIG. 4 except the fin 220 is oriented such that the parallel sections 244 are parallel with the terminal side 216 of the cell 218 and the fin 220 has a different shape. The fin 220 is pentagonal in shape. The fin 220 is disposed against the sidewall 224 of the cell 218. The fin 220 defines a serpentine coolant channel 242. The inlet and outlet ports 226, 228 provide openings into the serpentine coolant channel 242 to connect with the supply and return hoses 30, 32. The coolant channel 242 has a plurality of parallel sections 244 interconnected by a plurality of return bends 246. The parallel sections 244 extend across a width 248 of the cells 218. The lengths of the parallel sections 244 increase from the inlet 226 to the outlet 228 providing a more uniform cell temperature. The two parallel sections 244 nearest the inlet 226 are shorter than the width 248 of the cell 218 and are within the sidewall 224. The two parallel sections 244 nearest the outlet 228 are longer than the width 248 of the cell 218 and extend beyond the sidewall 224 into an extended portion 238 of the fin 220.

The fin 220 in FIG. 5 has a tapered extended portion 238. The extended portion 238 is tapered along line 260 so that the width of the fin 220 corresponds with the serpentine coolant channel 242. More or less than two pipe sections 244 can be longer than the sidewall 224 of the cell 218. Similarly, more or less than two pipe sections 244 can be shorter than the width of the sidewall 224. The fin 220, in an alternative design, could be rectangular and not include a taper, as is shown in FIG. 4. The fin 220 in FIG. 5 is oriented to have the outlet port 228 located near the terminal side 216. However, the fin 220 could be oriented to have the inlet port 226 located near the terminal side 216.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery comprising:
   adjacent cells; and
   a fin disposed between the cells and defining a serpentine fluid channel having an inlet and outlet, and a plurality of generally parallel sections extending across the cells such that lengths of the sections increase from the inlet to the outlet and the length of at least one of the sections near the outlet is greater than a width of the cells to increase heat transfer near the outlet.

2. The battery of claim 1 wherein the length of at least one of the sections near the inlet is less than the width of the cells.

3. The battery of claim 1 wherein the length of at least one of the sections is equal to the width of the cells.

4. The battery of claim 1 wherein each of the sections has a generally uniform cross section.

5. The battery of claim 1 wherein the channel is configured to circulate a heated fluid to heat the cells.

6. The battery of claim 1 wherein the channel is configured to circulate a coolant to cool the cells.

7. A battery assembly comprising:
   a battery array having at least two cells; and
   a heat exchanger disposed between and in thermal communication with the cells, and defining a plurality of generally parallel interconnected channels configured to direct a fluid between an inlet port and an outlet port, wherein the channels near the outlet are greater in length than the channels near the inlet.

8. The battery assembly of claim 7 wherein each of the channels has a generally uniform cross section.

9. The battery assembly of claim 7 wherein each of the cells includes terminals and wherein the heat exchanger is disposed between the cells such that the channels having greater length are located near the terminals and the channels having shorter length are located opposite the terminals.

10. The battery assembly of claim 7 wherein the heat exchanger includes a plurality of return bends fluidly connecting the channels to provide a continuous serpentine fluid path between the inlet and outlet ports.

11. A battery assembly comprising:
    adjacent cells each having a sidewall; and
    at least one cooling fin disposed between the cells next to the sidewalls and defining a serpentine coolant channel having an inlet and outlet, and a plurality of generally parallel sections extending across the cells such that lengths of the sections increase from the inlet to the outlet, at least one of the sections near the outlet extends beyond a perimeter of the sidewalls, and at least one of the sections is surrounded by the perimeter of the sidewalls.

12. The battery assembly of claim 11 wherein each of the sections has a generally uniform cross section.

13. The battery assembly of claim 12 wherein the serpentine coolant channel further has a plurality of return bends fluidly connecting the sections adjacent to each other.

* * * * *